US009340927B2

(12) United States Patent
Heiskanen et al.

(10) Patent No.: US 9,340,927 B2
(45) Date of Patent: May 17, 2016

(54) SOLVENT-RESISTANT LIQUID PACKAGING BOARD, ITS MANUFACTURING METHOD AND USE, AND A DRINKING CUP MADE OF THE SAME

(75) Inventors: Isto Heiskanen, Imatra (FI); Janne Myllykangas, Imatra (FI); Timo Räisänen, Imatra (FI)

(73) Assignee: STORA ENSO OYJ, Helsinki (FI)

( * ) Notice: Subject to any disclaimer, the term of this patent is extended or adjusted under 35 U.S.C. 154(b) by 334 days.

(21) Appl. No.: 12/937,160

(22) PCT Filed: Apr. 8, 2009

(86) PCT No.: PCT/FI2009/050269
§ 371 (c)(1),
(2), (4) Date: Oct. 8, 2010

(87) PCT Pub. No.: WO2009/125068
PCT Pub. Date: Oct. 15, 2009

(65) Prior Publication Data
US 2011/0031156 A1 Feb. 10, 2011

(30) Foreign Application Priority Data

Apr. 9, 2008 (FI) ..................................... 20085292

(51) Int. Cl.
| | |
|---|---|
| *B65D 85/00* | (2006.01) |
| *B32B 33/00* | (2006.01) |
| *D21H 17/20* | (2006.01) |
| *D21H 21/16* | (2006.01) |
| *B32B 27/10* | (2006.01) |
| *B32B 27/32* | (2006.01) |
| *B65D 65/42* | (2006.01) |
| *B32B 27/08* | (2006.01) |
| *B32B 27/36* | (2006.01) |
| *B32B 27/40* | (2006.01) |
| *D21H 17/17* | (2006.01) |
| *D21H 17/56* | (2006.01) |
| *D21H 19/22* | (2006.01) |
| *D21H 21/20* | (2006.01) |
| *D21H 27/10* | (2006.01) |

(52) U.S. Cl.
CPC ............... *D21H 21/16* (2013.01); *B32B 27/08* (2013.01); *B32B 27/10* (2013.01); *B32B 27/32* (2013.01); *B32B 27/36* (2013.01); *B32B 27/40* (2013.01); *B65D 65/42* (2013.01); *B32B 2307/31* (2013.01); *B32B 2307/714* (2013.01); *B32B 2307/718* (2013.01); *B32B 2307/72* (2013.01); *B32B 2307/7265* (2013.01); *B32B 2307/73* (2013.01); *B32B 2439/00* (2013.01); *B32B 2439/70* (2013.01); *D21H 17/17* (2013.01); *D21H 17/56* (2013.01); *D21H 19/22* (2013.01); *D21H 21/20* (2013.01); *D21H 27/10* (2013.01); *Y10T 428/1303* (2015.01)

(58) Field of Classification Search
CPC .... B32B 27/10; B32B 27/32; B32B 2307/31; B32B 2307/714; B32B 2307/718; B65D 65/42; B65D 65/40; D21H 17/17; D21H 17/56; D21H 19/22; D21H 21/16; D21H 21/20; Y10T 29/49078; Y10T 29/499115; Y10T 428/254; Y10T 428/1303; Y10T 428/24372; Y10T 428/24934
USPC ..................... 206/524.6; 428/219, 34.2, 35.7; 162/164.1
See application file for complete search history.

(56) References Cited

U.S. PATENT DOCUMENTS

| | | | |
|---|---|---|---|
| 4,517,285 A | 5/1985 | Woodward et al. | |
| 2004/0234802 A1* | 11/2004 | Hubinette et al. | ............ 428/535 |
| 2005/0112305 A1 | 5/2005 | Swoboda et al. | |
| 2007/0010386 A1 | 1/2007 | Champ et al. | |
| 2007/0060986 A1 | 3/2007 | Heiskanen et al. | |

FOREIGN PATENT DOCUMENTS

| | | | |
|---|---|---|---|
| JP | 2139493 A | 5/1990 | |
| JP | 2002-2792 A | 1/2002 | |
| JP | 2003-182719 A | 7/2003 | |
| JP | 2003-336189 A | 11/2003 | |
| JP | 2005-17719 A | 1/2005 | |

(Continued)

OTHER PUBLICATIONS

Kirwan, Mark J. (2005). Paper and Paperboard Packaging Technology. Blackwell Publishing. (http://www.knovel.com/web/portal/browse/display?_EXT_KNOVEL_DISPLAY_bookid=1377&VerticalID=0).*

(Continued)

*Primary Examiner* — Yan Lan
(74) *Attorney, Agent, or Firm* — Birch, Stewart, Kolasch & Birch, LLP

(57) ABSTRACT

Polymer-coated, heat-sealable liquid packaging board that resists solvents (e.g. strong alcoholic drinks), method of manufacturing board, and drinking cup made of board. Resistance to solvents is achieved by lowering raw edge penetration into the board. The fiber base of the board contains at least 1.3 kg of hydrophobic size containing alkyl ketene dimer and at least 1.0 kg of wet-strength size per 1 ton of dry matter. Fiber base density is 630-800 kg/m$^3$. The amount of heat-sealable polymer in the top layer is higher than the Bristow wheel roughness volume of the uncoated fiber base and/or at least 14 g/m$^2$. When manufacturing the board, the alkyl ketene dimer size and a wet-strength size are added into the stock. The pH of the tail water is adjusted so as to be alkaline (about 7 or more).

20 Claims, No Drawings

(56) References Cited

FOREIGN PATENT DOCUMENTS

| JP | 2006-160321 A | 6/2006 |
| JP | 2008-188812 A | 8/2008 |
| WO | WO 01/49938 A1 | 7/2001 |
| WO | WO 2005/003460 A1 | 1/2005 |
| WO | WO 2006/084883 A1 | 8/2006 |
| WO | WO 2008/066487 A1 | 6/2008 |

OTHER PUBLICATIONS

International Search Report, PCT/FI2009/050269, mailed on Jun. 25, 2009.
Office Action issued in the priority Finnish application No. 20085292, dated on Jun. 23, 2009.
Partial English translation of the Japanese Office Action for Application No. 2011-503466 dated Jun. 29, 2012.
Search Report dated Mar. 13, 2013 for European Application No. 09729894.7.

* cited by examiner

SOLVENT-RESISTANT LIQUID PACKAGING BOARD, ITS MANUFACTURING METHOD AND USE, AND A DRINKING CUP MADE OF THE SAME

The invention relates to a heat-sealable liquid packaging board, which resists solvents, such as strong alcoholic drinks, and comprises a fibre base, which on at least one side thereof is provided with a polymer coating layer. Furthermore, the invention comprises a method of manufacturing such liquid packaging board, and a drinking cup, which is made of the board by heat-sealing and which resists strong alcoholic drinks. The invention also comprises the use of the liquid packaging board in packages or containers intended for alcoholic drinks, liquid soap, solvents and other solvent-based products.

Generally, polymer-coated packaging board is used in packages and containers intended for liquid foodstuffs and other liquid-based or wet products. The inner polymer layer of the package or container protects the board against moistening and wetting and, depending on the polymer grade, provides an oxygen and/or flavour protection for the product contained in the closed package. The polymer can also protect the board against the fat contained in the product. Furthermore, the polymer coating makes it possible to heat-seal the board, when making the packages or containers.

In addition to the polymer-coated inner surfaces, the inner cutting edges or so-called raw edges of the cardboard package or container are exposed to the wet or liquid product, the liquid being possibly absorbed into the board through the edges. To avoid this, the board may be folded around its edges, so that the raw edges are hidden inside the casing of the seamed package or container or that they are turned onto its outer surface, or the edge of the board may be skived and thereafter folded double, so that the raw edge is closed. Another approach to the problem of absorption of the raw edges has been to prevent the absorption by suitable sizes of the board. The patent specification WO 2005/003460, for example, describes a cardboard autoclave package, wherein to reduce the raw edge absorption, the board is treated with a hydrophobic size, such as alkenyl amber acid anhydride (ASA) or alkyl ketene dimer (AKD), a wet-strength size, such as polyamidoamine epichlorohydrin resin (PARE), and an aluminium or calcium compound, which are used in optimized interrelations.

The specification WO 01/49938 describes a liquid packaging board, which is suitable for milk products, juices, hot drinks, etc., and which is glued with AKD size, wet-strength size and calcium carbonate to improve the hydrophobicity of the board. However, the hydrophobicities stated are insufficient for demanding applications.

Typical products, which the packages and containers made of the liquid packaging board are intended for, comprise different liquid and wet foodstuffs, such as milk products, water, juices, wine, coffee and other hot drinks, soups, desserts and processed food. The present liquid packaging boards do not resist strong alcoholic drinks, mainly due to the dissolving effect of the ethanol that is absorbed into the board through the raw edges. This also applies to liquid soaps, organic solvents and solvent-based products. The raw edge absorption can be assessed by means of the contact angle between the board and a liquid drop on the same; the larger the contact angle, the better the board in repelling liquid. Accordingly, it has been possible to increase the contact angle of the board and water by means of suitable sizes, whereas ethanol, other organic solvents and soaps decrease the contact angle of the present liquid packaging boards in spite of the sizes contained in them.

In present cup boards, which are used in disposable drinking cups suitable for coffee, tea, juices, beer or similar mild alcoholic drinks, the sizing is typically carried out with a resin size and a large amount of alum. Technically, the resin size could be replaced with AKD size, but this is not the case in cup boards due to financial reasons.

The specification JP 2006-160321 A discloses a cardboard drinking cup intended, among others, for strong alcoholic drinks, the edge of its casing blank being thinned and folded, so that the raw edge of the vertical seam of the casing is avoided. The specification JP 2003-182719 A discloses a cylindrical packaging container suitable for packing alcohol, juice, water, milk and other drinks, its casing being formed by winding from a continuous packaging board web. One edge of the web is folded double, so that the raw edges of the web remain inside the casing structure of the container and on its outer surface. The specification JP 2002-002792 A further describes a cardboard cup that functions as the package of an alcoholic drink, wherein the alcohol is packed in a closed plastic bag inside the cup. Thus, in all of these known solutions, the contact between the alcohol and the raw edge of the board is prevented.

The purpose of the invention is to provide an improved polymer-coated heat-sealable liquid packaging board, cup board, in particular, the raw edges of which resist the contact with strong alcohol, i.e., a 30-45 volume-% aqueous solution of ethanol, a liquid soap or other liquid that has a strong dissolving effect, so that it is unnecessary to mechanically protect the inner raw edges of the package or container containing the liquid by folding or using another similar method according to the known technology. The board can thus be processed to form a liquid package or container, such as a drinking cup by conventional methods, which leave the inner raw edge at the seam visible. The invention is based on tests, according to which the resistance of the liquid packaging board to solvents can be considerably improved by a combination of features comprising the fact that the fibre base of the board contains at least 1.3 kg of hydrophobic size containing alkyl ketene dimer (AKD) per 1 tonne of dry matter, and at least 1.0 kg of wet-strength size per 1 tonne of dry matter, the density of the fibre base is 630-800 $kg/m^3$ and the amount of heat-sealable polymer in the top layer of the board is higher than the Bristow wheel roughness volume of the uncoated fibre base and/or at least 14 $g/m^2$.

When combined, the said features of the invention considerably decrease the absorption of a strong dissolving liquid, such as ethanol solution, into the fibrous layer of the board through the inner raw edge of the package or container. According to observations, the effect is enhanced by heat-sealing the polymer-coated board adjacent to the raw edge, and by the collapse of the board that takes place therein. Without restricting the invention to any theory, it seems that ethanol, for example, tends to proceed in the packaging board along the air bubbles on the interface of the fibre base and the polymer coating (the contact angle between the ethanol solution and plastic is smaller than that between the ethanol solution and the board), and the collapse of the fibre base in the heat sealing removes these propagation paths that favour the penetration of ethanol. Heat sealing also crystallizes chemical pulp, thus reducing its swelling and the penetration of liquid, and furthers the migration of AKD to the interface of the fibre base and polymer.

Other factors that reduce the raw edge penetration to the ethanol solution, observed according to the invention, include the alkalinity of the board, i.e., the pH, which is measured from the aqueous extract of the board by a method according to ISO 6588 and which is over 7.0, preferably over 7.5, and the selection of the alkyl ketene dimer of the hydrophobic size, so that its carbon chain contains at least 16 carbon atoms (C16) and preferably at least 18 carbon atoms (C18).

The alkyl ketene dimers of the hydrophobic size, which as sizes of chemical pulp fibre are known as such, can be based on unsaturated or saturated, straight-chain or branched-chain C16-C22 fatty acids or mixtures of such fatty acids. The C18 alkyl ketene dimer size preferable for the invention is a commercially available product. The minimum amount of AKD size according to the invention is 1.3 kg/tonne of dry matter, measured from the finished board. The amount of AKD size is preferably at least 1.5 kg and more preferably at least 1.7 kg/tonne of dry matter of the finished board. As all of the AKD size is not retained, the corresponding dosages for the pulp or wire are somewhat higher.

According to the invention, a suitable wet-strength size is polyamidoamine epichlorohydrin resin (PAAE), in particular, which is also well-known from paper sizing. As other possible wet-strength sizes, urea-formaldehyde resin, melamine-formaldehyde resin, the condensate of polyacrylamide and glyoxal, polyvinyl amine, polyurethane and polyisocyanate could be mentioned.

The fibre base can consist of chemical pulp or a mixture of chemical pulp and chemithermo-mechanical pulp (CTMP), whereby the mixture comprises at least 7% by weight, preferably at least 10% by weight of CTMP. According to the invention, the density of the fibre base is 630-800 kg/m³, preferably 650-750 kg/m³.

According to the invention, especially polyethylene, which is easy to heat-seal, is suitable for the coating polymer of the board. Other possible coating polymers include polypropylene, polyamide and polyethylene terephthalate. The polymer coating can also comprise several layers and consist of various polymers, which fulfil various barrier functions in the coating, for example. Such polymer combinations are well-known to those skilled in the art. The polymer can be extruded on both sides of the fibre base, so that the outer surface of the package or container also becomes polymer-coated.

The Bristow wheel roughness volume, which is used as the criterion for the amount of coating polymer, is based on the measurement of the amount of liquid absorbed by the board base according to the standard ASTM D5455-93 (2003), which measurement is extrapolated to the moment of time t=0, i.e., the moment, when the liquid has only filled the volume (roughness volume) that remains between the nozzle and the board surface without having penetrated into the structure of the board.

In the method of manufacturing the liquid packaging board described above, according to the invention, which resists solvents, a fibre base is manufactured by a paper and board machine and provided with a polymer coating layer that is extruded at least on one side thereof. According to the invention, at least 1.3 kg of hydrophobic size containing AKD per 1 tonne of dry matter (measured from the finished board) is incorporated into the fibre base, and at least 1.0 kg of wet-strength size, such as PAAE, per 1 tonne of dry matter (measured from the finished board), preferably so that the AKD size and the wet-strength size are added into the stock on the wire of the paper and board machine, or even before. To achieve the pH value of >7.0 of the finished board mentioned above, the pH of the tail water is adjusted so as to be alkaline, suitably to a value of >9 and most preferably to a value of >9.5. The fibre base of the board is dried and compacted by a machine to a density of 630-800 kg/m³, preferably 650-750 kg/m³ and, on the fibre base, an amount of coating polymer is extruded, which is larger than the Bristow wheel roughness volume of the uncoated fibre base and/or at least 14 g/m², preferably at least 17 g/m².

The heat-sealed cardboard drinking cup according to the invention, which resists alcoholic drinks and which is formed from cup board that comprises a fibre base and a polymeric coating layer that constitutes the inner surface of the cup, is characterized in that, to lower the raw edge penetration to the board, the fibre base comprises, at the inner seal of the cup, at least 1.3 kg of hydrophobic size containing alkyl ketene dimer per 1 tonne of dry matter, and at least 1.0 kg of wet-strength size per 1 tonne of dry matter, that the density of the fibre base is 630-800 kg/m³ and that the amount of polymer in the coating layer is higher than the Bristow wheel roughness volume of the uncoated fibre base and/or at least 14 g/m².

The drinking cup according to the invention is capable of holding a 30% by weight ethanol solution at a temperature of 23° C. for at least 1 hour. This means that the raw edge rejects the penetration of the solution into the fibre base, largely preventing the loosening or softening of the structure of the cup. According to stricter criteria, the cup resists a 40 or 50% by weight ethanol solution at the said temperature or the 30% ethanol solution at 40° C. or 60° C. for 1 hour.

The invention also comprises the use of the liquid packaging board according to the above or manufactured according to the above in packages or containers intended for alcoholic drinks, liquid soaps or solvents, particularly in drinking cups intended for strong alcoholic drinks.

EXAMPLE 1

To define the effect of the amount of polymeric coating, a three-layer liquid packaging board, which was sized with AKD and wet-strength sizes and weighed 285 g/m², and the outer layers of which consisted of 100% chemical pulp and the middle layer contained 30% of chemical pulp and 70% of CTMP, and the density of which was 650 kg/m³, was extrusion-coated on both sides with polyethylene (PE) having a layer weight of 10-30 g/m². A Bristow wheel roughness volume of 12 g/m² was measured from the uncoated board (the fibre base). Strips were cut from the coated board, their size being 25 mm×75 mm. For 1 hour, the strips were kept in a stained soap solution, which contained 2% by weight of soap (Aerosol OT) in water and the temperature of which was 23° C. The strips were measured for the maximum raw edge absorption (REP) as the length of absorption on various amounts of polyethylene coating. The results are shown in the following Table 1.

TABLE 1

| Amount of PE coating (g/m²) | REP (mm) |
| --- | --- |
| 10 | 25 (through the strip) |
| 15 | 2.5 |
| 20 | 1 |
| 30 | 0.5 |

EXAMPLE 2

Liquid packaging boards, which were extrusion-coated with PE on both sides and sized with AKD (2 kg/tonne) and wet-strength sizes (1.5 kg/tonne), were tested intensively; the weight of the boards' fibre base was 190 g/m² and the weights of the PE layers on different sides of the fibre base were 14 g/m² and 17 g/m² (a) or on both sides 20 g/m² (b). For 1 hour, the strips that were cut from the coated board were kept in stained ethanol solution, which comprised 25-50% by weight of ethanol in water and the temperature of which was 23° C. The strips were measured for the maximum raw edge absorptions of the boards (a) and (b) (REP-a and REP-b) as the weight of absorbed solution on different ethanol concentrations. The results are shown in the following Table 2.

TABLE 2

| Ethanol (volume-%) | REP-a (kg/m$^2$) | REP-b (kg/m$^2$) |
|---|---|---|
| 25 | 1.01 | 0.60 |
| 30 | 1.43 | 0.63 |
| 35 | 1.92 | 0.86 |
| 40 | 2.56 | 0.84 |
| 45 | 2.95 | 1.85 |
| 50 | 4.65 | 3.76 |

EXAMPLE 3

To determine the effect of heat-sealing, the strips cut from the PE-coated board and the cups made by heat-sealing from the PE-coated board were measured for the raw edge absorptions on ethanol solutions that comprised 25-40 volume-% of ethanol in water. The temperature was 23° C. and the test lasted for 1 hour. The strips and cups comprised the same base board, a fibre base with a weight of 190 g/m$^2$, and the weights of the PE layers on different sides of the fibre base were 14 g/m$^2$ and 20 g/m$^2$ (the strips) or on both sides thereof 20 g/m$^2$ (the cups). The results are shown in the following Table 3.

TABLE 3

| Ethanol (volume-%) | REP in strips (mm) | REP in cups (mm) |
|---|---|---|
| 25 | about 1 | about 1 |
| 30 | about 6 | about 2.5 |
| 35 | about 7.5 | about 3 |
| 40 | 35 (through the strip) | about 20 |

EXAMPLE 4

A test run was run by a test board machine, wherein the chemicals used comprised the standard chemicals used in the manufacture of liquid packaging board. The board was manufactured from chemical pulp, so that its basis weight was 150 g/m$^2$. Exceptions to the normal manufacture of liquid packages comprised:

the AKD grade used (C18 and C22 refer to the length of the carbon chain of the raw material used in the manufacture of AKD; a mixture of C16/C18 is normally used)

the amount of AKD used (higher than normal)

pH of the tail water (deviating from the pH level optimal for AKD)

the amount of wet-strength size (its amount being larger than normally).

The samples were extrusion-coated on both sides with a PE layer with a weight of 20 g/m$^2$. The strips that were cut from the samples were kept in an aqueous solution containing 33% by volume of ethanol for 1 hour. The results are shown in the following Table 4.

TABLE 4

| Resin size (kg/tonne) | 3.5 | | | |
|---|---|---|---|---|
| Carbon chain of AKD | | C18 | C18 | C22 |
| AKD size (kg/tonne) | | 4 | 4 | 4 |
| Wet-strength size (kg/tonne) | | | 2 | |
| pH of tail water | 4.2 | 9.5 | 9.5 | 9.5 |
| REP (kg/m$^2$) | 6.81 | 3.89 | 1.10 | 1.85 |

EXAMPLE 5

The extrusion-coated board according to the invention, which was sized with AKD and PAAE, was used to make a drinking cup by heat-sealing, its raw edge absorption being defined by keeping, in the cup, a stained ethanol solution that comprised 40 volume-% of ethanol in water for 1 hour. The maximum penetration (REP) was about 2.5 mm.

EXAMPLE 6

The test board machine was used for making a series of boards, the weight of their fibre base being 150 g/m$^2$, and the boards were provided on both sides with an extruded PE coating layer with a weight of 20 g/m$^2$. 2 kg/tonne of wet-strength size and 3 kg/tonne of AKD C-18 size were used. The pH of the tail water varied within 7-10.5 in the manufacture of the various boards. The board was measured for the pH of the cold water extract, the surface pH, and the raw edge absorptions on water, coffee, coffee with cream and 35 volume-% ethanol. The results are shown in the following Table 5.

TABLE 5

| pH of tail water | 7 | 8 | 9 | 10 | 10.5 |
|---|---|---|---|---|---|
| Wet-strength size (kg/tonne) | 2 | 2 | 2 | 2 | 2 |
| AKD C-18 (kg/tonne) | 3 | 3 | 3 | 3 | 3 |
| pH cold water extract | 6.6 | 6.7 | 6.7 | 7.7 | 7.3 |
| Surface pH | 6.1 | 6.5 | 6.6 | 6.5 | 6.9 |
| Coffee REP (aeration) kg/m2 | 8.6 | 7.2 | 7.0 | 5.6 | 4.7 |
| Coffee REP (matured) (kg/m2) | 2.2 | 1.0 | 0.8 | 0.8 | 0.7 |
| Coffee with cream REP (aeration) (kg/m2) | 7.9 | 5.8 | 4.9 | 3.6 | 2.8 |
| Coffee with cream REP (matured) (kg/m2) | 2.6 | 1.4 | 1.0 | 1.0 | 0.9 |
| REP ethanol 35% 1 h 23° C. | 4.0 | 2.8 | 0.93 | 0.61 | 0.47 |
| REP water 24 h 4° C. (kg/m2) | 1.8 | 1.7 | 1.7 | 1.7 | 1.8 |

The invention claimed is:

1. A heat-sealable liquid packaging fibre-based board that resists solvents selected from the group consisting of alcoholic drinks, organic solvents, and liquid soaps, which on at least one side is provided with a polymeric coating layer having a weight of at least 15 g/m$^2$, characterized in that, to lower the raw edge penetration to the board, the fibre base comprises at least 1.3 kg of hydrophobic size containing alkyl ketene dimer (AKD) per 1 tonne of dry matter and at least 1.0 kg of wet-strength size per 1 tonne of dry matter, that the density of the fibre base is 630-800 kg/m$^3$, that the amount of heat-sealable polymer in the coating layer is higher than the Bristow wheel roughness volume of the uncoated fibre base and/or at least 14 g/m$^2$, that the fibre base has been manufactured by a board machine by adjusting the pH of the tail water to a value of over 9.0, that the pH of the water extract of the board, which is measured by the ISO 6588 method, is over 7.0, and that the raw edge penetration of a 2 weight-% soap solution at 23° C. for 1 hour is 2.5 millimeters or less.

2. A liquid packaging board according to claim 1, characterized in that the weight of the polymeric coating layer is at least 17 g/m².

3. A liquid packaging board according to claim 1 or 2, characterized in that the coating polymer is polyethylene.

4. A liquid packaging board according to claim 1, characterized in that the fibre base comprises at least 1.5 kg of hydrophobic size containing alkyl ketene dimer (AKD) per 1 tonne of dry matter.

5. The liquid packaging board of claim 4, characterized in that the fibre base comprises at least 1.7 kg of hydrophobic size containing alkyl ketene dimer (AKD) per 1 tonne of dry matter.

6. A liquid packaging board according to claim 1, characterized in that the AKD comprises a carbon chain, the length of which is at least C18.

7. A liquid packaging board according to claim 1, characterized in that the wet-strength size is polyamidoamine epichlorohydrin resin (PAAE).

8. A liquid packaging board according to claim 1, characterized in that the pH of the water extract of the board, which is measured by the ISO 6588 method, is over 7.5.

9. A heat-sealable liquid packaging fibre-based board that resists alcoholic drinks, which on at least one side is provided with a polymeric coating layer having a weight of at least 15 g/m², characterized in that, to lower the raw edge penetration to the board,
the fibre base comprises at least 1.3 kg of hydrophobic size containing alkyl ketene dimer (AKD) per 1 tonne of dry matter and at least 1.0 kg of wet-strength size per 1 tonne of dry matter, that
the density of the fibre base is 630-800 kg/m³, that
the amount of heat-sealable polymer in the coating layer is higher than the Bristow wheel roughness volume of the uncoated fibre base and/or at least 14 g/m², that
the fibre base has been manufactured by a board machine by adjusting the pH of the tail water to a value of over 9.0, that
the pH of the water extract of the board, which is measured by the ISO 6588 method, is over 7.0, and that
the raw edge penetration of 35 volume-% ethanol at 23° C. for 1 hour is less than 0.93 kg/m².

10. The heat-sealable liquid packaging fibre-based board of claim 9, wherein
the raw edge penetration of 35 volume-% ethanol at 23° C. for 1 hour is 0.61 kg/m² or less.

11. A heat-sealed board drinking cup comprising a disposable, open container configured to be suitable for containing alcoholic beverages, wherein said cup resists alcoholic drinks and is formed, from (i) cup board that comprises a fibre base having a density of 630-800 kg/m³ and comprises, at an inner seal of the cup, at least 1.3 kg of hydrophobic size containing alkyl ketene dimer (AKD) per 1 tonne of dry matter and at least 1.0 kg of wet-strength size per 1 tonne of dry matter, and (ii) a polymeric coating layer that constitutes the inner surface of the cup, by (iii) heat-sealing the coating polymer adjacent to a cut raw edge of the board, wherein the amount of polymer in the coating layer is higher than the Bristow wheel roughness volume of the uncoated fibre base and/or at least 14 g/m², and the pH of the board is over 7.0, and wherein said cup resists raw edge penetration to the board.

12. A drinking cup according to claim 11, characterized in that the density of the fibre base is 650-750 kg/m³.

13. A drinking cup according to claim 11 or 12, characterized in that the weight of the polymeric coating layer is at least 17 g/m².

14. A drinking cup according to claim 11, characterized in that the outer surface of the cup is also coated with a polymeric coating layer.

15. A drinking cup according to claim 11, characterized in that the fibre base comprises at least 1.5 kg of hydrophobic size containing alkyl ketene dimer (AKD) per 1 tonne of dry matter.

16. The drinking cup according to claim 15, characterized in that the fibre base comprises at least 1.7 kg of hydrophobic size containing alkyl ketene dimer (AKD) per 1 tonne of dry matter.

17. A drinking cup according to claim 11, characterized in that the AKD comprises a carbon chain, the length of which is at least C18.

18. A drinking cup according to claim 11, characterized in that the wet-strength size is polyamidoamine epichlorohydrin resin (PAAE).

19. The drinking cup of claim 11, wherein the polymeric coating layer has a weight of at least 15 g/m² and the raw edge penetration of a 2 weight-% soap solution at 23° C. for 1 hour is 2.5 millimeters or less.

20. A method of manufacturing the heat-sealed board drinking cup according to claim 11, comprising the steps of:
producing a fibre base from fibrous stock in a board machine by adding hydrophobic size containing alkyl ketene dimer (AKD) to a stock to produce a content of at least 1.3 kg of hydrophobic size containing alkyl ketene dimer (AKD) per 1 tonne of dry matter in the fibre base, adding wet-strength size to the stock to produce a content of at least 1.0 kg of wet-strength size per 1 tonne of dry matter in the fibre base, adjusting the pH of the tail water to a value of over 9, and drying the fibre base to a density of 630-800 kg/m³, so that the pH of the water extract of the fibre base, which is measured by the ISO 6588 method, is over 7.0;
extruding a polymer coating layer onto at least one side of the fibre base in an amount which is higher than the Bristow wheel roughness volume of the uncoated fibre base and/or at least 14 g/m²; and
forming a board drinking cup, which is an open container with polymer coating on at least its inner surface, by heat-sealing the coating polymer adjacent to a cut raw edge of the fibre base, wherein said cup has a resistance to alcoholic drinks and wherein said cup has a raw edge penetration of 35 volume-% ethanol at 23° C. for 1 hour of less than 0.93 kg/m².

* * * * *